United States Patent [19]

Stevens

[11] Patent Number: 5,427,710

[45] Date of Patent: *Jun. 27, 1995

[54] PAINT STRIPPING COMPOSITIONS AND METHODS

[76] Inventor: Edwin Stevens, 30 Brookside Rd., West Orange, N.J. 07052

[*] Notice: The portion of the term of this patent subsequent to Jun. 20, 2012 has been disclaimed.

[21] Appl. No.: 227,789

[22] Filed: Apr. 14, 1994

Related U.S. Application Data

[63] Continuation-in-part of Ser. No. 48,466, Apr. 14, 1993.

[51] Int. Cl.$^6$ .................. C09D 9/00; C11D 7/24; C11D 7/26; C23G 5/036
[52] U.S. Cl. .................. 252/166; 252/167; 252/170; 252/171; 252/172; 252/173; 252/174.25; 252/364; 252/DIG. 8; 106/311; 134/38
[58] Field of Search ........... 252/166, 167, 170, 171, 252/172, 173, 364, 174.25, DIG. 8; 106/311; 134/38

[56] References Cited

U.S. PATENT DOCUMENTS

| | | | |
|---|---|---|---|
| 2,705,207 | 3/1955 | Stevens . | |
| 4,276,186 | 6/1981 | Bakos et al. | 252/162 |
| 4,294,729 | 10/1981 | Bakos et al. | 252/162 |
| 4,414,128 | 11/1983 | Goffinet | 252/162 |
| 4,533,487 | 8/1985 | Jones | 252/162 |
| 4,749,510 | 6/1988 | Nelson | 252/162 |
| 4,758,377 | 7/1988 | Iding | 252/162 |
| 4,767,563 | 8/1988 | de Buzzaccarini | 252/162 |
| 4,780,235 | 10/1988 | Jackson . | |
| 4,808,396 | 2/1989 | Shibanai et al. | 423/579 |
| 4,812,255 | 3/1989 | Suwala | 252/162 |
| 5,098,591 | 3/1992 | Stevens | 252/162 |
| 5,124,062 | 6/1992 | Stevens | 252/162 |
| 5,167,853 | 12/1992 | Stevens | 252/162 |
| 5,288,335 | 2/1994 | Stevens | 134/38 |

Primary Examiner—Paul Lieberman
Assistant Examiner—Margaret Einsmann
Attorney, Agent, or Firm—Henry D. Coleman; R. Neil Sudol

[57] ABSTRACT

The present invention relates to light and heat reactive paint or polymer stripping compositions preferably employing biodegradable components such as conjugated terpenes and related polyenes in combination with an alcohol such as a phenyl substituted benzyl alcohol for use in removing polymeric materials from substrates, in particular, cured paint from hard and/or flexible surfaces. The compositions avoid the use of methylene chloride, phenol, corrosives and caustics, methanol, toluol or acetone. Compositions according to the present invention preferably have flash points above about 49° C. (about 120° F.) and a pH which is preferably neutral. Methods of stripping polymeric coatings from surfaces and methods of making these compositions are also described.

46 Claims, No Drawings

PAINT STRIPPING COMPOSITIONS AND METHODS

RELATED APPLICATIONS

This application is a continuation-in-part of application Ser. No. 08/048,466, entitled "Photoreactive Paint Stripping Compositions and Methods", filed Apr. 14, 1993.

FIELD OF THE INVENTION

The present invention relates to novel compositions and methods which are useful for softening or stripping paint. More particularly and preferably, the invention employs compositions which are generally reactive to light or heat energy (UV, visible, infrared, convection heat) and are substantially biodegradable, which remove paint and other polymeric coatings from flexible and inflexible surfaces.

BACKGROUND OF THE INVENTION

Present methods for the removal of polymeric substrates from surfaces such as aircraft, railcars and aging steel structures such as bridges (which may include lead based paint), involve the use of abrasives, highly alkaline compositions or materials which exhibit a high degree of toxicity and corrosiveness.

Typically, the method of choice is to sand blast the structure at high pressure. The process, however, produces airborne particulates, sometimes containing lead and silicates. Additionally, sand blasting expands exponentially the mass of contaminant to be treated or disposed.

Alternatives to the use of sand blasting include the chemical strippers, which generally fall into one of two categories. Some strippers fall into both. One category is the caustic removers, the other is solvent based removers. The caustic removers may be formulated as liquids or paste compositions.

Stripping compositions containing strong corrosive agents, for example, phenol, in combination with methylene chloride and other substances are presently in use for stripping commercial aircraft. When applied, these compositions cause the paint to swell and loosen from the grounding. The outer coating is then scraped off by hand. This rather tedious procedure has several drawbacks. First, the solvents used (in particular, phenol and methylene chloride) are highly toxic, caustic, deleterious and/or carcinogenic. Second, safety regulations require workers to wear protective clothing and gas masks, both of which must be disposed of after only a single use. A third drawback is that the flooring under the airplane must be fully covered to protect it from drippings and penetration by the corresive agents. Fourth, the paint residue (which may amount to several tons of waste material from a single aircraft), clothing and floor covering must be specially disposed of as a toxic waste at great expense.

OBJECT OF THE INVENTION

It is an object of the present invention to provide paint stripper compositions which are safe and effective to remove paint and other polymeric coatings in protective and decorative coatings on flexible and inflexible surfaces.

It is also an object of the present invention to provide compositions which are non-flammable and effective paint strippers and which avoid the use of halogenated solvents, petroleum based aromatic compounds, ketones, methanol and alkali metal hydroxides.

It is an additional object of the present invention to provide stripping compositions and methods for removing conventional polymeric coatings such as paints, coatings, nail polishes and the like, which utilize lacquers, varnishes, enamels, for example, drying oil type, alkyds, or drying oil-alkyd modified enamels, epoxy esters, epoxy amides, amine-catalyzed epoxies, acrylics, polyurethanes and two part epoxy primer/polyurethane top coats, among numerous others.

It is a further object of the present invention to provide a method of stripping polymeric coatings using the compositions of the present invention to reduce the mass or volume of effluent generated in the prior art stripping processes.

It is still an additional object of the invention to provide a method of stripping exterior polymeric coatings which facilitates separation of removed toxic coatings from the medium of removal without generating additional toxins than those already present in the coating to be removed.

It is yet another object of the invention to provide a method of making the compositions of the present invention, especially those compositions which are thixotropic in character.

It is yet an additional object of the invention to provide compositions which can be applied by an airless spray system by forcing the composition through a nozzle of sufficient diameter under effective pressure so that shear forces permit deposition of a composition having sufficient viscosity and surface tension to adhere to vertical surfaces.

These and other objects of the invention may be readily gleaned from the description of the invention which follows.

BRIEF DESCRIPTION OF THE INVENTION

The present invention relates to novel paint and polymeric coating chemical strippers which preferably are reactive to light and/or heat energy (UV, visible, infrared and other). Compositions according to the present invention are preferably substantially non-toxic, non-flammable safe compositions employing primarily biodegradable components for use in removing polymeric materials from substrates, for example, cured paint from rigid and/or flexible surfaces. The compositions avoid the use of methylene chloride, phenol, corrosives, methanol, toluol or acetone.

Compositions according to the present invention preferably have flash points above about 49° C. (about 120° F.) and a pH which is preferably less than about 10–11, more preferably within a range of about 4 to about 9, and most preferably about neutral pH (about 5.5–8.5).

In one aspect according to the present invention paint stripping compositions are described which consist essentially of effective amounts of a light reactive polyene, generally a conjugated polyene, preferably a conjugated terpene compound or other natural product containing conjugated carbon-carbon double bonds in combination with an effective amount of a solubilizing alcohol, more preferably a phenyl-substituted benzyl alcohol or a terpene alcohol. Benzyl alcohol is the most preferred alcohol for use in the instant invention.

The alcohol may be a monohydroxy alcohol generally selected from the group consisting of butanol, pentanol, hexanol, heptanol, octanol, dimethyl octanol, 3-octanol, decanol, undecanol, dodecanol, benzyl alcohol, cyclopentanol, cyclohexanol, isomers of these alcohols and mixtures, thereof. Terpene alcohols and benzyl alcohol may also be preferably used in the present invention as an alcohol. Examples of terpene alcohols include for example, dimethyl octanol, dihydromyrcenol, dihydroterpineol, dihydrolinalool, citronellol, dihydrocarveol, geraniol, arbanol, linalool, nerol, menthol, nopol, cis-2-pinanol, fernlol, tetrahydrolinallol, tetrahydromyrcenol, tetralol and mixtures thereof, among numerous others. Benzyl alcohol and phenyl substituted benzyl alcohols and other "activated alcohols", including activated terpene alcohols, are especially preferred for use in the present invention, with benzyl alcohol being most preferred.

Phenyl-substituted benzyl alcohols also may be used in the present invention. Examples of phenyl-substituted benzyl alcohols for use in the instant invention include those compounds according to the structure:

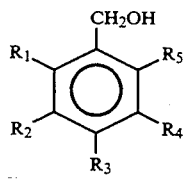

where $R_1$–$R_5$ are H, $C_1$–$C_5$ alkyl, $NH_2$, OH or $OCH_3$; with the proviso that when one of $R_1$, $R_2$, $R_3$, $R_4$ or $R_5$ is $NH_2$, OH or $OCH_3$, the remainder of $R_1$, $R_2$, $R_3$, $R_4$ or $R_5$ are H or $C_1$–$C_3$ alkyl.

In the present invention, the use of benzyl alcohol or an alkyl-substituted benzyl alcohol (most preferably, $C_1$–$C_3$ alkyl substituted at the 2, 4 and/or 6 position of the phenyl ring) is preferred, with benzyl alcohol being especially preferred. When an alkyl-substituted benzyl alcohol is used (no other substitutents on the phenyl ring other than H), the alkyl groups are preferably substituted on the 2, 4 and/or 6 positions of the benzene ring.

In addition to the above components, compositions according to the present invention preferably contain an effective amount of at least one thixotropic or rheological agent, more preferably an organoclay rheological additive and most preferably a hydrophilic organoclay rheological additive, for example, a hectorite clay such as Bentone "EW" or "LT" (available from NL Industries, Hightstown, N.J., USA). A mixture of a non-hydrophilic organoclay (for example, organic, non-hydrophilic Bentones) and a hydrophilic organoclay rheological additive is preferred for use in the instant invention. The amount of thixotropic agent included in compositions according to the present invention ranges from about 0.05% to about 60% by weight of the compositions.

The present invention relates to the unexpected discovery that the inclusion of a conjugated polyene in combination with an alcohol of determinate structure produces a composition which removes polymeric coatings from flexible and inflexible surfaces in the presence of a light or heat source (UV or visible light source, infrared or convection heat source) at an unexpectedly rapid rate. Preferred compositions also exhibit substantially non-toxic and substantially biodegradable chemical characteristics.

In addition to a light reactive polyene and solubilizing alcohol, compositions according to the present invention preferably include a terpene compound other than a conjugated terpene in an amount ranging from about 0% to 70% or more by weight as well as other components which are optional, including one or more of the following: about 0.1% to about 20% by weight of a surfactant, about 5% to about 30% by weight of a solvent extender or bulking agent such as isopropanol or ethanol, and about 0.5% to about 20% by weight of an odor masking component, for example d'limonene (which also may be included as a terpene compound) and mixtures, thereof.

In a related aspect according to the present invention, a paint stripping composition consists essentially of about 10% to about 60% by weight of a terpene compound, preferably dipentene, in combination with about 10% to about 95% by weight benzyl alcohol, preferably about 20% to about 50% by weight, about 0% to about 50% by weight of a terpene alcohol and about 0.05% to about 60% by weight of a hydrophilic organoclay thixotropic agent. This aspect of the instant invention is directed to compositions which make use of the paint stripping efficacy of a terpene compound in combination with an effective amount of benzyl alcohol. In order to significantly enhance the efficacy of these paint stripping compositions within the general teachings of the present invention, it is preferred to add at least one conjugated diene terpene such as alpha-terpinene, myrcene, allo-ocimene, terpinolene or isoterpinolene or a related terpene in an amount ranging from at least about 5% to about 90% by weight of the final composition and more preferably about 10% to about 40% by weight.

Although not required for activity, a UV or visible light absorber or activator, such as Sanduvor VSU TM from Sandoz Chemicals Corporation, Charlotte, N.C. and chlorophyll may be included in certain compositions according to the present invention in amounts effective to enhance the stripping efficiency of the compositions, generally about 0.5% to about 5% or more by weight of the composition. Various types of chlorophyll may be used in the present invention including chlorophyll a, b, c and d. Chlorophyll for use in the present invention may be purchased from a number of suppliers, including Chart Corporation, Inc.

Chlorophyll acts as a catalyst in photosynthesis, using energy from sunlight, combined with water and carbon dioxide to liberate oxygen in the production of simple sugars. In the present invention, while not being limited by way of theory, it is believed that chlorophyll (as well as other sensitizers, especially including UV sensitizers) acts to promote the formation of photo oxides (peroxides or other reactive species). A range of chlorophyll products in oil or water soluble form, coppered or uncoppered may be useful in the present invention. The oil-soluble coppered and uncoppered chlorophylls have vegetable oil, vegetable fatty acids or white soft paraffin as diluents. A number of chlorophyll products may be used in compositions according to the present invention in amounts ranging from about 0.1% to about 5% or more.

Numerous other components may also be included in the compositions of the present invention, for example, solvents such as N-methylpyrrolidone and related pyrrolidones and pyrrolidines, propylene, ethylene or butylene carbonate, dibasic esters (generally, refined dimethyl, diethyl, dipropyl, diisopropyl or mixed esters (methyl, ethyl, propyl, isopropyl) of adipic, glutaric, succinic acids and mixtures thereof) such as those commonly used in currently marketed biodegradable paint strippers, gamma-butyrolactone and other cyclic esters and related compounds, among others. In certain cases, the inclusion of the dibasic esters and/or propylene, ethylene or butylene carbonate represent preferred embodiments. These components may be added in amounts ranging from about 2% to about 70% by weight of the final composition, with a preferred weight range being about 5% to about 40% by weight, more preferably about 10% to about 30% by weight.

The components which are added in the paint strippers according to the present invention are preferably substantially biodegradable and substantially non-toxic.

The compositions of the present invention can be used to strip or remove conventional lacquers, varnishes, enamels, epoxy esters, epoxy amides and acrylics, among other polymeric coatings. The time required to strip paint finishes completely is competitive with, or in certain cases better than that, of conventional strippers containing chlorinated solvents. Compositions according to the present invention, because of their high flash points, are often capable of removing multiple layers of paint and other polymeric coatings.

In certain aspects of the present invention, the instant paint stripping compositions are quite effective in removing lead based paints from surfaces. This is an unexpected result.

The compositions according to the present invention are particularly useful for stripping the coatings from commercial aircraft and military equipment which coatings are known to be very difficult to remove. It is particularly unexpected that compositions which are substantially biodegradable and substantially non-toxic would remove such coatings in relatively short periods of time, i.e., less than about 5 hours and in many cases less than two hours.

In removing coatings from surfaces, the compositions of the present invention produce a wrinkling or blistering of the polymer coating. While not being limited by way of theory, this fundamental blistering is believed to be produced by solvent interaction with the coating. When normally insoluble high molecular weight polymers are placed in contact with an active solvent, the polymer absorbs the solvent and expands until an equilibrium condition occurs. In order to accommodate the increased volume and still remain within the original surface perimeter, the polymer tends to fold or wrinkle so as to relieve internal stresses. The solvent mixtures solvate the active groups of the polymer, and in so doing, reduce solid to solid adhesion. The forces which build up in the polymer generally, as a result of a combination of swelling and weakened adhesion, are sufficiently high to tear the film loose from the surface. Wrinkle formation occurs because solvent penetration into the polymer and deterioration of the polymer bonds proceed at approximately the same speed. There is rapid parting of the film from the substrate and almost as rapid rupturing of the film itself.

DETAILED DESCRIPTION OF THE INVENTION

The present invention relates to the discovery that the inclusion of light reactive or conjugated polyenes, preferably natural product conjugated polyenes such as terpenes in combination with a solubilizing alcohol such as benzyl alcohol, produce a paint stripping composition which, when exposed to an energy source, preferably a light source (visible, UV and/or infrared) and/or a heat source, exhibits surprisingly favorable polymer stripping activity when compared to prior art paint stripping compositions.

Compositions according to the present invention are preferably substantially biodegradable and substantially non-toxic. The terms "substantially non-toxic" and "substantially biodegradable" are used throughout the specification to describe the preferred characteristics of compositions according to the present invention. One of ordinary skill in the art will readily recognize that these terms are relative terms, i.e., they are used to describe compositions according to the present invention relative to conventional paint strippers containing major amounts of methylene chloride, methanol, phenol and similar solvents which are substantially toxic and substantially non-biodegradable. It is understood that while most of the preferred components which are used in the preferred non-toxic and biodegradable compositions according to the present invention are themselves substantially non-toxic and biodegradable, it is not required that all components be non-toxic and biodegradable. One of ordinary skill in the art will recognize that minor quantities of toxic and/or non-biodegradable components may be added to the preferred compositions according to the present invention without materially altering the basic and novel characteristics of these compositions.

The present invention embodies the unexpected discovery that light reactive polyenes, generally conjugated dienes, trienes and related polyenes (including 1, 4 enone systems) are believed to react with an oxygen source (molecular oxygen or other oxygen source) in the presence of an energy source (light and/or heat such as a UV or visible light source or an infrared or convection heat source) to yield reactive species believed to be organic peroxides (photooxides). While not being limited by way of theory, these photooxides are believed to be highly active species which are particularly effective in combination with the disclosed alcohols, in particular, benzyl alcohol or related phenyl-substituted benzyl alcohol compounds for use as paint stripping compositions. It is the combination of a light reactive or conjugated polyene in combination with the disclosed alcohols, in the presence of effective amounts of light or heat energy, which is believed to be primarily responsible for the enhanced activity exhibited by compositions according to the present invention.

Compositions according to the present invention generally contain effective amounts of a conjugated or light reactive polyene to produce enhanced paint stripping activity. In general, an effective amount of a conjugated polyene for use in the present invention comprises about 2% to about 90%, preferably about 5% to about 50% and more preferably about 10% to about 45% by weight of the compositions according to the present invention. A conjugated polyene for use in the present invention is generally an organic compound (i.e., contains carbon atoms) having at least two double bonds (generally, carbon-carbon, or in the case of enones, carbon-carbon/carbon-oxygen) in conjugation. Preferably, the conjugated organic compound is a natural product such as a conjugated terpene compound or a polyene such as beta-carotene or lycopene and more preferably is a terpene having at least two double bonds in conjugation.

As used herein, the terms "conjugated polyenes and/or conjugated dienes" include organic compounds, preferably hydrocarbons, both natural and synthetic which have at least two double bonds (and in certain cases three or more bonds) in conjugation and are solids or have sufficiently high flash points as liquids (generally, above about 49° C. or 120° F.) to be useful in paint stripping compositions according to the present invention. Conjugated polyenes and/or conjugated dienes are useful in the present invention because of their ability to be activated in the presence of a light and/or heat source (UV, visible, IR, convection oven, etc.).

The term "conjugation" is used throughout the specification to describe at least two double bonds (either carbon-carbon or carbon-carbon/carbon-oxygen) between alternating carbon atoms within a carbon chain. Thus, conjugated double bonds would be found between the first and second carbon atoms in a chain and at least the third and fourth (in certain cases also the fifth and sixth, seventh and eight, etc.) carbon atoms in the chain. In the case of conjugated systems which are or contain 1,4-enone systems, a carbon-carbon double bond is found between the carbon atoms alpha and beta to the "keto" or carbon-oxygen double bond, Thus, the term "double bonds in conjugation" or "conjugated double bonds" includes dienes, triene, tetraenes, etc. and enones, dienones and trienones, etc. Conjugated or terpene compounds are terpene compounds which contain at least two double bonds (carbon-carbon or carbon-carbon/carbon-oxygen) in conjugation as generally described herein.

The terms "light reactive polyene" and "conjugated polyene" are used synonymously throughout the specification to describe conjugated organic compounds, preferably conjugated hydrocarbons, more preferably natural product conjugated hydrocarbons including conjugated terpenes, which are believed to form photooxides or other reactive species upon exposure to a light and/or heat source (preferably, UV, sunlight, other visible light, infrared or convection oven) alone or in the presence of a photoactivating compound such as chlorophyll or a UV sensitizer.

While any number of synthetic conjugated polyenes may be used in the present invention, it is preferred that "natural product polyenes" be used, including "conjugated terpene compounds" as well as other natural polyenes such as beta-carotene and lycopene (each having 11 conjugated double bonds). The conjugated diene systems which are useful in the present invention include carbon-carbon double bonds in conjugation as well as carbon-carbon/carbon-oxygen double bonds in combination (such as 1,4-enone, dienone and trienone systems). Terpene polyene compounds for use in the present invention include, for example, alpha-terpinene, myrcene, hymentherene, cosmene, tagetol, phellandrene, citral, ocimene, ocimenone, myrcenol, terpinolene, allo-ocimene, ocimenone, tagetone, tagetol, pseudoionone, pseudomethylionone and pseudoisomethylionone, among others. Certain mixtures of terpenes, for example, those which contain substantial quantities (about 5% or more by weight) of alpha-terpinene and/or other conjugated terpene compounds generally set forth hereinabove, such as terpene mixture Dipentene "D TM", M TM" or "C TM", available from Pine Derivatives Marketing, Inc. (PDM), Wilmington, Del., may also be used in the present invention. The conjugated terpene compounds, and especially, alpha-terpinene, tagetone, terpinolene, isoterpinolene, allo-ocimene, myrcene and ocimenone are preferred for use in the present invention, because of the relative absence of toxicity, substantial biodegradability and relative activity of these compounds compared to conventional components such as methylene chloride, phenol and methanol.

While the use of alpha-terpinene and terpene compounds containing substantial quantities of alpha-terpinene and related conjugated terpene compounds are preferred, a number of conjugated polyenes may be used as preferred substitutes in the present invention. The conjugated terpenes myrcene, allo-ocimene, terpinolene, isoterpinolene and alpha-terpinene are more preferred for use in the present invention, with alpha-terpinene being most preferred.

The visible portion of the electromagnetic spectrum as well as UVA (320 to 400 nm) and UVB (about 240 to 320 nm) contribute to the photoactivity of the compositions, depending upon the light reactive components utilized. UVB has a significant influence on the reactivity of compositions which contain conjugated terpenes, in particular, alpha-terpinene and myrcene. UV absorption is believed to be the primary energy source for the formation of photooxides and other reactive species; however, heat energy in the form of infrared or convection energy may also be used alone or in combination with UV or visible light energy. The amount of light or heat energy used is that amount effective to substantially enhance the stripping efficiency of the present compositions compared to the same compositions which are not exposed to light and/or heat energy (at least about room temperature). Formation of photooxides in the presence of visible light may be facilitated by the addition of a photoactivating compound such as chlorophyll. The inclusion of heat from a heat source such as an infrared source or convection oven may also enhance reactivity, with temperatures above about room temperature being preferred. Temperatures of about 23° C. to about 63° C. (72° F. to about 145° F.), more preferably about 43° C. to about 63° C. (about 110°–145° F.) in combination with UVB light is a preferred source of energy for enhancing activity and promoting the stripping efficiency of the compositions according to the present invention.

In addition to a light reactive or conjugated polyene, compositions according to the present invention may include an alcohol selected from the group consisting of butanol, pentanol, hexanol, heptanol, octanol, nonanol and decanol, among others, including isomers of these alcohols as well as mixtures, thereof. Preferred alcohols for use in the present invention include those alcohols which contain flash points above about 49° C. (120° F.).

More preferred for use in the present invention are "activated alcohols", including benzyl alcohol or any one or more substituted benzyl alcohols (substituted on the benzylic carbon position or any one or more phenyl carbons), among others, including activated terpene alcohols, as described hereinbelow. The term "activated alcohol" is used to describe an alcohol which contains a carbon-carbon double bond or a conjugated system (such as a phenyl group) at a position alpha to the hydroxylated carbon of the alcohol. More preferably, benzyl alcohol (or a related phenyl-substituted benzyl alcohol compound as disclosed herein) is used as the alcohol in the present invention. Benzyl alcohol is the most preferred alcohol for use in the present invention. While not being limited by way of theory, it is believed that the activated alcohol and especially benzyl alcohol may actually participate in the stripping activity either by enhancing the stripping efficiency of the compositions or by solubilizing the coating to be removed from a surface.

Benzyl alcohol and phenyl-substituted benzyl alcohols also may be used in the present invention. Examples of benzyl alcohol and phenyl-substituted benzyl alcohols for use in the instant invention include those compounds according to the structure:

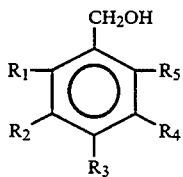

where $R_1$–$R_5$ are H, $C_1$–$C_5$ alkyl, $NH_2$, OH or $OCH_3$; with the proviso that when one of $R_1$, $R_2$, $R_3$, $R_4$ or $R_5$ is $NH_2$, OH or $OCH_3$, the remainder of $R_1$, $R_2$, $R_3$, $R_4$ or $R_5$ are H or $C_1$–$C_3$ alkyl.

In the present invention, the use of benzyl alcohol or an alkyl-substituted benzyl alcohol (most preferably, $C_1$–$C_3$ alkyl substituted at the 2, 4 and/or 6 position of the phenyl ring) is preferred, with benzyl alcohol being especially preferred. When an alkyl-substituted benzyl alcohol is used (no other substitutents on the phenyl ring other than H), the alkyl groups are preferably substituted on the 2, 4 and/or 6 positions of the benzene ring.

The alcohol is used in compositions according to the present invention in amounts effective to enhance the paint stripping activity of the reactive polyene. The amount of alcohol in the present compositions ranges from about 5% to about 95% by weight of the composition, more preferably about 10% to about 60% by weight and most preferably about 20% to about 50% by weight. The amount of conjugated polyene used in compositions according to the present invention generally ranges above about 2%, usually within the range of about 5% to about 90% by weight The amount of conjugated polyene will vary within this weight range as a function of its photoreactivity and its ability to interact with the solubilizing alcohol included in the compositions to remove polymers from substrates. The conjugated polyene is preferably included in amounts ranging from about 10% to about 40% by weight of the composition.

The preferred alcohol for use in the instant invention is benzyl alcohol or a phenyl substituted benzyl alcohol at a weight ratio of about 10% to about 95% by weight, and a preferred weight ratio of about 20% to about 90% by weight, more preferably about 30% to about 50% by weight. The alcohol is most preferably benzyl alcohol. The preferred conjugated polyene is a conjugated terpene. The conjugated terpene is preferably selected from alpha-terpinene, myrcene, terpinolene, isoterpinolene, allo-ocimene and mixtures, thereof. The conjugated terpene is most preferably alpha-terpinene which is included at a preferred weight ratio of about 10% to about 40%. In compositions which utilize both benzyl alcohol and a conjugated terpene, the weight ratio of benzyl alcohol to terpene ranges from about 1:1 to about 10:1, with a preferred weight ratio when alpha-terpinene is the conjugated terpene of about 1:1 to about 3:1 (benzyl alcohol to alpha-terpinene).

In addition to a light reactive or conjugated polyene, the compositions of the present invention optionally may comprise from about 2% to about 70% by weight of a terpene compound other than a conjugated terpene compound. As used herein, the term terpene compound refers to a class of acyclic and cyclic unsaturated compounds derived from natural essential oils and resins having at least 10 carbon atoms. Terpenes that find use in the present invention include alcohols and aldehydes as well as unsaturated hydrocarbons. Any number of terpene compounds, including combinations of these terpenes may be used in the present invention as the base or primary solvent as polymer absorbents. Preferred terpene compounds are those compounds which have a $K_B$ value of at least about 60 and a flash point above about 49° C. (about 120° F.).

In the case of compositions which include a thixotropic agent, an organoclay rheological additive is most preferably added. Thixotropic agents are included in the instant compositions in amounts ranging from about 0.05% to about 60% by weight. Preferably an organoclay rheological additive (a modified smectite or hectorite clay) is utilized. More preferably a hydrophilic organoclay rheological additive is included, for example, a modified hectorite clay such as Bentone "EW" or "LT" is included in amounts ranging from about 5% up to about 50% by weight, more preferably about 10% to about 45% by weight. Most preferably a mixture of a non-hydrophilic organoclay rheological additive (for example, an organic, non-hydrophilic Bentone) and a hydrophilic organic rheological additive is included. This combination has been shown to provide acceptable rheology which is consistent with the use on vertical surfaces of paint strippers according to the present invention. In certain instances where a hydrophilic organoclay rheological additive is included, a polar activating solvent such as ethanol, isopropanol, propylene carbonate, N-methylpyrrolidone, benzyl alcohol or a related solvent or a mixture of water and activating solvent may be included in amounts generally ranging from about 0.5% to about 20% or more, preferably about 3% to about 18% by weight of the compositions. Water may also be included in the instant compositions, but in many instances, the inclusion of water is less preferred.

$K_B$ is a measure of the solvency of a hydrocarbon. In general, the higher the $K_B$ value, the greater the general solvent power of the hydrocarbon under test conditions described by ASTM D1133. To determine $K_B$ value, a hydrocarbon sample is added to a standard solution of kauri gum in butyl alcohol until sufficient kauri gum precipitates to blur vision of 10 point type viewed through the flask. When used in varnish, lacquer and enamel formulations, a hydrocarbon diluent with a high $K_B$ value dissolves relatively large quantities of solids.

Terpene compounds (other than conjugated terpene compounds or terpene alcohols) which may optionally be added to the light reactive or conjugated polyenes and solubilizing alcohol included in the present invention are represented by unsaturated hydrocarbons and aldehydes having at least 10 carbon atoms and include alpha-pinene, beta-pinene, delta-3-carene, citronellal, d-limonene, gamma-terpinene, and dipentene, among numerous others, with cyclic terpenes being preferred.

The present invention may include terpene alcohols. Terpene alcohols which find use in the present invention include for example, dihydromyrcenol, dihydroterpineol, dihydrolinalool, citronellol, allo-camenol, dihydrocarveol, geraniol, arbanol, linalool, nerol, menthol, nopol, cis-2-pinanol, isoborneol, fernlol, farnesol, fenchol, nerolidol, piperitol, borneol, cineol, isobulegol, allcimenol, tetrahydrolinallol, tetrahydromyrcenol, tetralol, tagetol, and mixtures thereof. Terpene alcohols are terpene compounds which contain an alcohol chemical functionality. The terpene alcohols may be used alone or in combination with other terpene compounds. Preferred terpene alcohols for use in the present invention include geraniol, tagetol, carveol, linalool, myrcenol and nerol. A preferred combination of terpene compounds is dipentene in combination with a terpene alcohol as set forth above. Terpene alcohols are generally included in compositions according to the present invention in amounts ranging from about 0% to about 50% by weight or more up to about 90% by weight and are preferably included in amounts ranging from about 5% to about 50% by weight, more preferably about 10% to about 40% by weight. Activated alcohols such as benzyl alcohol and the activated terpene alcohols such as geraniol, linalool, nerol, myrcenol, tagetol and carveol may generally be used in amounts ranging from about 5% to about 90% by weight.

Compositions of the present invention optionally include about 0% to about 60% by weight of a terpene compound other than a conjugated terpene or terpene alcohol. Preferred compositions of the present invention may comprise between about 5% to about 55% by weight, and most preferably, between about 10% and about 50% by weight of a terpene compound other than a conjugated terpene compound or terpene alcohol.

Compositions according to the present invention also include at least about 0.05% (generally, up to about 60%) by weight of a thixotropic agent, preferably about 5% to about 50% and more preferably about 10% to about 45% by weight. The preferred thixotropic agent is an organoclay thixotropic agent, such as Bentone 27, 38, EW and LT. Hydrophilic organoclay thixotropic agents such as Bentone EW and LT are more preferred. Mixtures of hydrophilic and non-hydrophilic organoclay thixotropic agents in amounts ranging from about 10% to about 45% by weight of the compositions are especially preferred. The inclusion of organoclay rheological additives are especially useful for enhancing the rheology of the formulations to produce high viscosity compositions in order to use the stripping compositions on vertical surfaces.

In the method aspects of the present invention, compositions of the present invention are used to strip and/or remove polymeric coatings on a number of surfaces, preferably in the presence of a light and/or heat source which imparts effective amounts of light and/or heat energy to the polymeric coating to be removed.

Depending upon the formulation of the composition to be used, further aspects of the present invention involve making the compositions of the present invention using a step-wise procedure in which thixotropic agents are mixed separately from the active ingredients. Certain thixotropic compositions, for example methylcellulose, such as Methocel 311, available from Dow Chemical Corp Midland, Mich., hydroxypropyl cellulose, Klucell TM, available from Hercules, Inc., Wilmington, Del., ethyl cellulose, such as Bermocol PR TM, available from Seaboard Sales, New Jersey) and clays modified with quaternary compounds (high, medium and low polar), such as Bentone 27, Bentone EW and Bentone LT, products of NL Industries, New Jersey, USA may be used in the instant invention, among others.

The compositions according to the present invention may advantageously utilize gel formation to produce a composition exhibiting enhanced stripping activity and acceptable thixotropy for stripping or removing polymeric coatings on vertical surfaces. Microgel formation using cellulose ether may be advantageously employed using this method.

Preferred organoclay rheological additives include organoclay rheological additives made from smectite and/or hectorite clays modified with quaternary compounds (high, medium and low polar), such as the stearalkonium hectorites (hectorite clays), for example, Bentone 27, Bentone 38 and the hydrophilic clays such as Bentone EW TM and Bentone LT TM, products of NL Industries, New Jersey, USA, with the hydrophilic Bentones TM, especially Bentone EW TM and LT TM being particularly preferred.

The organoclay additives are preferably utilized as thixotropic agents in the compositions of the present invention. The organoclays which can be utilized in the present invention generally depend on wetting, shear and polar activation for rheological development. One class of the organoclays, the high performance hydrophilic organoclays, including Bentone EW TM and Bentone LT TM, depend only upon shear, hydration and wetting for activity. They are especially useful in the compositions according to the present invention. These hydrophilic organoclays may offer the formulator opportunities to incorporate large quantities of thixotropic agent in the compositions without appreciably impacting the activity of the compositions. The result is a composition in the form of a paste having very high viscosity which may be advantageously applied to a variety of vertical surfaces for removing polymers.

In certain embodiments where certain terpenes such as dipentene are used, a malodor sometimes occurs. In such cases, a natural odor masking terpene compound, for example, d'limonene, among other odor masking agents, may be added in an amount ranging from about 0.25% to about 20% by weight in order to make the compositions more pleasant in odor. D'limonene may also be added for its beneficial effects as a terpene compound for use in the present invention.

In many instances, it will be unnecessary to include a surfactant in the paint stripping composition. However, in certain embodiments according to the present invention a surfactant may be advantageously included in an effective amount, i.e., an amount equal to about 0.1% to about 20% by weight and preferably about 0.1% to about 15% by weight of the paint stripping compositions of the present invention. The surfactant is primarily added to compatibilize the componentry of the paint stripping compositions and to instill better water dispersibility for purposes of removing the compositions from walls, panels and other surfaces with water.

In compositions containing organoclay rheological additives such as the Bentones TM, when surfactants are included, they generally comprise about 0.1% to about 20% by weight of the composition.

Numerous surfactants capable of emulsifying the components of the present invention may be employed, including but not limited to linear or branched chain alcoholic ethoxylates and ethoxysulfates, alcohol ethoxylates, polysorbate esters, ethoxylated alkylphenols, for example, polyethoxynonylphenols, phenoxypolyalkoxyalcohols, for example, nonylphenoxypoly(ethyleneoxy)ethanol and nonylphenoxypolyethoxyethanol, alkyl and alkyl ether sulfates and sulfonates, for example, dodecylbenzenesulfonic acid, alkyl and dialkyl succinate compounds, phosphate esters, for example phosphate esters of long-chain alcohol ethoxylates and combinations of these surfactants. Other surfactants for use in compositions of the present invention include the phosphate ester surfactants, such as PD-600 TM, an alkaline stable mixture of mono and di-substituted phosphate esters of decylalcoholethoxylate, available from Chemax, Inc. (Greenville, S.C.) and the Tryfac TM phosphate esters, a series of phosphate ester surfactants as the free acids or various salts, available from Emery Chemicals, Mauldin, S.C. Other surfactants include polyoxyethylenenonylphenol (NP-6 TM and NP-9 TM, available from Chemax, Inc., Greenville, S.C.) as well as the nonionic alkylphenoxypolyoxyethylene alcohols, the Makon TM series, available from Stepan Company, Northfield, Ill. Alkylamine dodecylbenzenesulfonate Ninate 411 TM, available from Stepan Company, the linear alkylbenzene sulfonic acid surfactant Bio-soft s-100 TM, available from Stepan, sodium 1-octane sulfonate, Bioterge pas-8s TM, available from Stepan and Neodol 1–5 TM, a nonionic surfactant having an average of 5.0 ethylene oxide units per molecule of alcohol, available from Chemax, Inc., are also useful in the present invention. A preferred surfactant for use in paint strippers having an alkaline or basic pH includes CSX-727, an alkaline stable surfactant also available from Chemax, Inc. These surfactants may be used alone or in combination to enhance the activity of the terpinoid and and to produce paint strippers having excellent paint stripping activity.

The pH of the paint stripper compositions of the present invention may vary over a relatively wide range generally under a pH of about 10–11. Preferred compositions generally have a pH ranging from about 4 to about 9, and most preferably have a neutral pH (about 5.5 to about 8.5). Certain paint strippers of the present invention which are to be used as industrial or military paint strippers may be quite alkaline, i.e., have a pH approaching 12.0 or more or have a pH which is quite acidic, i.e, about 2.5 or lower. In instances where a higher pH is desired, a base, preferably a biodegradable amine containing base, is included in the compositions. Exemplary amines included for the purpose of raising the pH of the composition include, for example, aminomethylpropanol, mono-, di- and trimethylamine, mono-, di- and triethylamine, mono-, di- and tripropylamine, triisopropylamine and related amine containing bases. Triethanolamine and ethanolamine, among other amine containing bases, may also be used to increase the pH of the compositions when necessary. Aminomethylpropanol, triethanolamine, ethanolamine and triethylamine are the preferred amine bases for inclusion in the present compositions, with aminomethylpropanol being especially preferred.

In cases where it is desired to have a low pH, for example a pH of about 3.5 or less, an acid may be added to the compositions according to the present invention. Preferred acids include the low pKa organic acids (pka's generally less than about 3.0) such as maleic acid, and other acids such as sulfamic acid and phosphoric acid, among others. In addition, in order to lower the pH of the composition for certain applications, an acidic phopshate ester surfactant such as PD-600 TM, among others, may also be added to the compositions.

The compositions according to the present invention, for routine paint and polymer removal, are preferably neutral in pH (about 5.5 to 8.5). It is an unexpected result that paint stripper compositions of the present invention show substantial paint stripping activity in the industrial setting within a neutral pH range. Thus, although an acidic or basic accelerator may be added to compositions of the present invention to increase stripping efficiency and shorten stripping time, such an acidic or basic accelerator is often not necessary. In compositions to be used in the home by the consuming public, it is preferred to exclude an acidic or basic accelerators to increase the safety. In certain preferred organoclay containing compositions, enhanced paint stripping activity is associated with a neutral pH, i.e., about 5.5 to about 8.5.

Anionic, nonionic and cationic surfactants may be employed in certain embodiments of the present invention which include a surfactant. It may be preferable in certain embodiments of the present invention to include a mixture of surfactants to enhance the solubility of certain active components in oil or water. A surfactant mixture may serve to promote the stripping of the polymeric coating by the active components and enhance the removal of the stripper and stripped coating by a washing step.

Although not required for activity, a UV or visible light absorber or activator, such as Sanduvor VSU TM from Sandoz Chemicals Corporation, Charlotte, N.C., among a number of others as well as chlorophyll may be included in certain preferred compositions according to the present invention in amounts effective to enhance the stripping efficiency of the compositions when exposed to a UV or visible light source, and in general about 0.1% to about 5% or more by weight. Chlorophyll may be added to compositions which are used as paint strippers for external or outdoor use, such as on home exteriors, bridges and in other outdoor applications where sunlight is expected to be the principal source of light energy.

In preferred embodiments, various types of chlorophyll may be used in the present invention including chlorophyll a, b, c and d, available from a number of suppliers, including Chart Corporation, Inc.

In addition to the above-described components, compositions according to the present invention may optionally include solvents Such as N-methylpyrrolidone and related pyrrolidones and pyrrolidines, propylene carbonate, ethylene carbonate and butylene carbonate, the dibasic esters (as previously described) of adipic, glutaric, succinic and mixtures thereof, gamma-butyrolactone as well as other cyclic esters and related solvents, among others. These optional solvents may be included in amounts ranging from about 0% to about 50% or more by weight or more of the instant compositions. One of ordinary skill will readily know to vary the amount and type of solvent to the present compositions to enhance various characteristics and/or attributes.

Other optional additives which may be included in paint stripping compositions according to the present invention include a solvent extender such as ethanol or isopropanol in an amount ranging from about 5% to about 30% by weight, water in amounts ranging from about 0% to about 25% about 0.25% to about 20% by weight of an odor-masking compound, preferably d'limonene, and mixtures thereof.

The compositions of the present invention are generally applied to the surface to be stripped in the usual manner, i.e., the compositions are first applied by brush, spatula or other applicator and then are applied to the surface to be stripped. Alternatively, the compositions may be sprayed onto a surface in a continuous flow method which recirculates the composition or alternatively sprayed onto the surface using an airless spraying system, such system taking advantage of the thixotropic characteristics of the compositions under shearing force and on vertical panels.

Generally, the compositions are in contact with the surface for a period of time sufficient to produce a blistering of the polymeric coating, after which time, the blistered coating is removed by contacting the coating with an abrasive pad. Alternatively, the coating is removed by simply lifting the blistered coating off of the surface or by spraying the blistered coating with water. In many instances, the compositions according to the present invention will strip seven or more coats of paint in as little as four hours or less.

Because exposure of the compositions to light (UV or visible) and/or heat (IR, convection) energy will enhance the stripping activity of the present invention, it is preferred that the stripping be performed in the presence of at least some light and heat energy. Bright visible light (in particular, bright sunlight) and UV light will be generally effective alone or optionally, in the presence of a photoactivator or sensitizer. The use of heat energy (in the form of infrared or convection heat) alone is also a favorable option and may be employed efficiently in enhancing the activity of compositions according to the present invention in removing paint and polymers from surfaces.

The method of stripping paint or polymers using the present invention employs the introduction of an effective amount of a paint stripper composition according to the present invention onto the surface to be stripped (generally, a thin layer which completely covers the surface to be stripped; with thicker coats of polymer to be removed, a thicker layer of stripper may need to be deposited) and introducing light and/or heat energy onto the surface which contains the stripping composition and the polymer to be removed. Although the amount of light and/or heat energy may vary, in the case of the use of light energy, it has been found that stripping activity increases as the amount of light energy applied to the surface to be stripped is increased. Thus, the use of direct sunlight, or a UV lamp (preferably emitting UVB or alternatively, a combination of UVA and UVB light energy) which is held close to the surface of the polymer to be stripped or alternatively, is an intense source of light, may be advantageously employed in the present invention. The amount of light and/or heat energy applied to a surface is an effective amount for enhancing the stripping efficiency of compositions according to the present invention. One of ordinary skill in the art will readily recognize that the type and amount of light energy to be delivered to the surface containing the polymer to be removed and the stripping composition may vary according to the activity of the stripping composition, the amount of composition deposited onto the polymer surface to be removed and the relative degree of difficulty removing the polymer from the surface.

Paint stripping compositions according to the present invention may also be activated in the presence of heat energy. Heat energy may be introduced by any means, but is preferably introduced onto the surface of the coating to be stripped using a simple convection source. An infrared heat source may also be used. Alternatively, in the case of metallic or composite substrates which are heat conductors, it may be possible to heat the underlying surface directly (electronically or using heat coils, etc.). In general, when heat is used as an energy source, the paint stripping composition should attain a temperature of at least about 23° C. (about 72° F.), preferably at least about 32° C. (about 90° F.), more preferably at least about 43° C. (about 110° F.). Preferably, the temperature should be no higher than about 63° C. (about 145° F.), because at temperatures above about 63° C., solvent may begin to evaporate from the surface to be stripped, thus actually reducing the activity of the composition. As one increases the temperature of the composition and substrate to be stripped, the stripping activity and efficiency generally increase up to a point.

A combination of heat and light energy, as generally described hereinabove is a preferred method for stripping paint. One of ordinary skill will know to vary the temperature and the type and amount of light energy to which the polymer to be stripped and the paint stripping compositions according to the present invention are exposed in order to enhance and facilitate the removal of polymeric coatings using the paint stripping compositions according to the present invention.

The following characteristics are identifiable in one or more embodiments according to the present invention:

(1) Increased stripping efficiency, i.e., reduced stripping time based upon enhanced reactivity in the presence of light (visible or UV) and/or heat (about 23°–60° C.).
(2) Raised flash point of the formulations to provide a stripper which will not evaporate appreciably within a stripping period.
(3) Minimized objectionable odors.
(4) Neutral pH for widest possible range of utilization and safety.
(5) Highest possible TLV (threshold limit value) and exposure, lowest toxicity, and maximum environmental acceptability.
(6) A water dispersible stripper composition which can be used in industrial settings where removal is performed by spraying a stripped surface with water.

The following examples are provided to illustrate the present invention and should not be misunderstood or misinterpreted to limit the scope of the present invention in any way.

EXAMPLES 1–51

General Procedure for Formulating Examples 1–51

Each component to comprise the paint stripping composition of the present invention is weighed out. The components are mixed in an order which minimizes exposure of the alcohol to the conjugated terpene. In certain instances, the conjugated polyene such as a conjugated terpene and thixotropic agent are first blended to produce a part A. Chlorophyll as well as other components may also be added to this part A or separately to part B, but generally, the alcohol is mixed separately from the conjugated terpene with other components to produce a part B which is eventually added to part A. This mixture is then agitated or simply mixed by hand until the composition is homogeneous. In an industrial setting it is anticipated that a high speed industrial mixer will be used to prepare the compositions in order to activate the organoclay thixotropic agent.

General Testing Procedures

Standardized test panels coated with the substrate to be stripped are prepared. Enamels, alkyds, epoxies, latex, acrylics and, conventional lacquers were tested.

All testing was performed on metal plates with at least three coats of paint, often with as many as seven coatings of paint, each coat having a different color so as to permit observation and time measurement of coating penetration. Stripping efficiency is defined as the ratio of the time required to observe blistering divided by 20 (minutes).

The testing of strippers occurred by placing aliquots of paint stripper onto test panels. Utilizing standard test plates, a droplet approximately ½ inch in diameter of a stripping composition is placed onto the test plate in the presence of a light source, and the time until the coating blisters is then measured. The most challenging substrates were chosen to be stripped, to establish the perfomance criteria expected of competitive paint strippers.

The first experiments (Examples 1–8) and tests were performed to determine whether preparations of photoactive compositions could be utilitarian in paint remover applications. Compositions were prepared, and aliquots applied to aluminum alloy panels coated with an epoxy/polyurethane paint system with a polysulfide sealant. The panels are samples of the paint system applied to naval aircraft and were supplied by the Naval Air Development Center. These coatings are extremely difficult to remove; conventional paint strippers have difficulty blistering and removing these tough military coatings.

In examples 9–51, test panels were prepared having seven different coatings of paint in addition to a primer coating. In addition to primer coating, the test panels had coatings of high gloss house paint, alkyd enamel, acrylic latex house paint, heavy duty polyurethane enamel, other alkyd enamel, rust inhibitive paint and latex semi-gloss paint. The panels were prepared to provide a representative cross-section of a majority of the different (chemical) types of coatings which are presently being used.

Examples 1–8

Examples 1–8 were performed to determine the utility of compositions containing a conjugated terpene in combination with benzyl alcohol and chlorophyll. Examples 2–6 monitored the use of thixotropic agent, in particular, an organoclay thixotropic agent. All compositions proved to be adequate in paint stripping activity. Based upon these examples, the inclusion of thixotropic agent was clearly beneficial in producing adequately performing paint stripper compositions.

Examples 6 and 7 were performed to determine the beneficial effect on the compositions by including Bentone 38 in the compositions. In Examples 5, 6 and 8, AMP-95, Witflow 934 and/or Hydral were added to determine the effect that alkalinity had on the relative activity of the compositions. Results indicated that the thixotropic agent plays an essential role in the useability of the compositions and alkalinity is not essential for obtaining exceptional paint stripping activity.

Test speciments, with aliquots from Examples 1–9 applied, and blank specimens were subjected to UV light (at a wavelength ranging from 200 to 400 nm) at 32° C. (about 90° F.) in a controlled environment. The panels were examined at 15 minute intervals. After 45 minutes, both sets of specimens were carefully examined. Speciments with aliquots applied to coatings generally had blistered within the 45 minute period with the coating being lifted cleanly from the alcad specimens.

Example 1

| Components | percent (wt.) |
| --- | --- |
| Alpha-Terpinene | 27.0 |
| Chlorophyll DD | 1.0 |
| Benzyl Alcohol | 72.0 |

This composition exhibited acceptable stripping efficiency and activity but tended to run on vertical or sloping surfaces.

Example 2

| Alpha-Terpinene | 30.0 |
| --- | --- |
| Chlorophyll DD | 1.0 |
| Benzyl Alcohol | 65.0 |
| Cyasorb UV-9 | 1.0 |
| Bentone 27 | 3.0 |

Bentone 27 was added in this example to facilitate the binding of the composition and prevent migration of the composition when applied to test specimens (panels). In addition, in Examples 2–6, a number of different UV sensitizers (Cyasorb) were added to the chlorophyll to determine the activity of the compositions.

Example 3

| Alpha-Terpinene | 30.0 |
| --- | --- |
| Chlorophyll DD | 1.0 |
| Benzyl Alcohol | 65.0 |
| Cyasorb UV-531 | 1.0 |
| Bentone 27 | 3.0 |

Example 4

| Alpha-Terpinene | 30.0 |
| --- | --- |
| Chlorophyll DD | 1.0 |
| Benzyl Alcohol | 65.0 |
| Cyasorb UV-5411 | 1.0 |
| Bentone 27 | 3.0 |

Example 5

| Alpha-Terpinene | 30.0 |
| --- | --- |
| Chlorophyll DD | 1.0 |
| Benzyl Alcohol | 53.0 |
| Cyasorb UV-24 | 1.0 |
| Bentone 27 | 3.0 |
| AMP-95 | 10.0 |
| Witflow 934 | 2.0 |

In this example 5, AMP-95 (aminomethylpropanol) and Witflow 934 (an alkaline surfactant) were added to the composition to determine the effect that alkalinity has on the activity of the compositions.

Example 6

| Alpha-Terpinene | 30.0 |
| --- | --- |
| Chlorophyll DD | 1.0 |
| Benzyl Alcohol | 40.0 |
| Cyasorb UV-24 | 1.0 |
| Bentone 38 | 3.0 |
| AMP-95 | 23.0 |

| | |
|---|---|
| Witflow 934 | 2.0 |

Bentone 38 was substituted for Bentone 27 because of its favorable thixotropic properties. Stripping efficiency about the same as other compositions but workability and useability was enhanced somewhat by to the choice of thixotropic agent. Based upon the results obtained for Examples 2–6, it was concluded that alkalinity is not critical to stripping efficiency.

Example 7

| | |
|---|---|
| Alpha-Terpinene | 30.0 |
| Chlorophyll MM | 1.0 |
| Benzyl Alcohol | 66.0 |
| Bentone 38 | 3.0 |

Example 8

| | |
|---|---|
| Alpha-Terpinene | 30.0 |
| Chlorophyll MM | 1.0 |
| Bentone 38 | 3.0 |
| Benzyl Alcohol | 40.0 |
| Bentone (EW) | 6.0 |
| AMP-95 | 6.0 |
| Witflow 934 | 2.0 |
| Hydral | 12.0 |

AMP-95, Witflow 934 and Hydral were used during experimentation to test whether alkalinity was a required property. These components are aminomethyl-propanol, an alkaline surfactant and hydrated aluminum hydroxide (hydrated with 3 water molecules). Tests performed on specimen panels evidenced that alkalinity was not required for activity. In many experiments thereafter, alkaline components were eliminated from subsequent experiments. The inclusion of Bentone EW (a hydrophilic organoclay thixotropic agent) did improve the workability and efficiency of stripping on vertical surfaces.

Examples 9–14

Standardized 9"×12" test panels were prepared for testing the following compositions (Examples 9–51). Each panel of regular plywood sheet had seven separate coatings (high gloss house paint, alkyd enamel, acrylic latex house paint, heavy duty polyurethane enamel, other alkyd enamel, rust inhibitive paint and latex semi-gloss paint), applied in addition to a primer coating. The panels were cured after each coat was applied in an oven at 49° C. (about 120° F.) for at least 24 hours.

Examples 9–14 were performed to determine the effect that a change in weight percent of conjugated terpene and benzyl alcohol would have on the efficiency of the formulation. The amount of benzyl alcohol which was considered optimum was determined to be about 40% by weight. In addition, the effect of the inclusion of dipentene varying in KB was assessed. The conclusion was that the KB value of dipentene played little role in enhancing the stripping efficiency of the compositions, but the inclusion of dipentene was considered beneficial, although not critical.

Example 9

| | |
|---|---|
| Alpha-Terpinene | 30.0 |
| Chlorophyll MM | .8 |
| Bentone 38 | 3.0 |
| Benzyl Alcohol | 40.0 |
| Dipentene (KB-100) | 20.2 |
| Bentone (EW) | 6.0 |

Example 10

| | |
|---|---|
| Alpha-Terpinene | 30.0 |
| Chlorophyll MM | 1.5 |
| Bentone 38 | 3.0 |
| Benzyl Alcohol | 40.0 |
| Dipentene (KB-100) | 19.5 |
| Bentone (EW) | 6.0 |

Example 11

| | |
|---|---|
| Alpha-Terpinene | 10.0 |
| Chlorophyll MM | 1.0 |
| Bentone 38 | 3.0 |
| Benzyl Alcohol | 50.0 |
| Dipentene (KB-100) | 30.0 |
| Bentone (EW) | 6.0 |

Example 12

| | |
|---|---|
| Alpha-Terpinene | 30.0 |
| Chlorophyll MM | 1.0 |
| Bentone 38 | 3.0 |
| Benzyl Alcohol | 40.0 |
| Dipentene (KB-100) | 20.0 |
| Bentone (EW) | 6.0 |

Example 13

| | |
|---|---|
| Alpha-Terpinene | 50.0 |
| Chlorophyll MM | 1.0 |
| Bentone 38 | 3.0 |
| Benzyl Alcohol | 30.0 |
| Dipentene (KB-100) | 10.0 |
| Bentone (EW) | 6.0 |

Example 14

| | |
|---|---|
| Alpha-Terpinene | 50.0 |
| Chlorophyll MM | 1.0 |
| Bentone 38 | 3.0 |
| Benzyl Alcohol | 30.0 |
| Dipentene (KB-64) | 10.0 |
| Bentone (EW) | 6.0 |

An increase in conjugated terpene was generally associated with an increase in stripping efficiency. Benzyl alcohol also plays an important role in obtaining stripping efficiency. Lower Kauri-Butanol Value Dipentene (KB value of 64, as opposed to 100) was inserted as a control variable to determine whether stripping activity was influenced by KB. Aliquots of Examples 13 and 14 were applied to the standardized 9"×12" panels. No measurable change in stripping time was observed.

Example 15

This example was performed to determine what effect the inclusion of water would have on stripping efficiency. In this example 15, the inclusion of water caused the stripping time to be decreased but the overall completeness of stripping (number of layers that the stripper lifted) was not affected.

| | | |
|---|---|---|
| | Alpha-Terpinene | 50.0 |
| | Chlorophyll MM | 1.0 |
| | Bentone 38 | 3.0 |
| | Benzyl Alcohol | 30.0 |
| | Water | 3.0 |
| | Dipentene (KB-64) | 10.0 |
| | Bentone (EW) | 3.0 |

Examples 16 and 17

These examples were performed to determine the effect that the inclusion of chlorophyll would have on the stripping efficiency of the compositions of the present invention. Example 16 changed the component order in anticipation of a two component binary system of delivery. Aliquots of Examples 16 and 17 were applied to standard 9"×12" panels and subjected to both direct sunlight and incident light in order to observe the influence of Chlorophyll on the compositions. Both examples performed well, however Example 17 exhibited slightly reduced stripping time in direct sunlight.

Example 16

| | | |
|---|---|---|
| | Alpha-Terpinene | 30.0 |
| | Bentone 38 | 3.0 |
| | Chlorophyll MM | 1.0 |
| | Benzyl Alcohol | 40.0 |
| | Dipentene (KB-100) | 20.0 |
| | Bentone (EW) | 6.0 |

Example 17

| | | |
|---|---|---|
| | Alpha-Terpinene | 30.0 |
| | Bentone 38 | 3.0 |
| | Benzyl Alcohol | 40.0 |
| | Dipentene (KB-100) | 21.0 |
| | Bentone (EW) | 6.0 |

Examples 18–21

Examples 18–21 were prepared to examine the performance of the higher molecular weight monohydroxy alcohol alternatives to Benzyl alcohol. Aliquots from Examples 18–21 exhibited significant stripping efficiency, all compositions performed significantly less favorably than did compositions prepared with a benzyl alcohol component.

Example 18

| | | |
|---|---|---|
| | Alpha-Terpinene | 30.0 |
| | n-Octyl Alcohol | 40.0 |
| | Bentone 38 | 3.0 |
| | Chlorophyll MM | 1.0 |
| | Dipentene (KB-100) | 20.0 |
| | Bentone (EW) | 6.0 |

Example 19

| | | |
|---|---|---|
| | Alpha-Terpinene | 30.0 |
| | n-Butyl Alcohol | 40.0 |
| | Bentone 38 | 3.0 |
| | Chlorophyll MM | 1.0 |
| | Dipentene (KB-100) | 20.0 |
| | Bentone (EW) | 6.0 |

Example 20

| | | |
|---|---|---|
| | Alpha-Terpinene | 30.0 |
| | n-Octyl Alcohol | 40.0 |
| | Bentone 38 | 3.0 |
| | Dipentene (KB-100) | 20.0 |
| | Bentone (EW) | 6.0 |

Example 21

| | | |
|---|---|---|
| | Alpha-Terpinene | 30.0 |
| | n-Butyl Alcohol | 40.0 |
| | Bentone 38 | 3.0 |
| | Dipentene (KB-100) | 21.0 |
| | Bentone (EW) | 6.0 |

Example 22

Example 22 was prepared to determine the effect of the conjugated polyene, and in particular, the conjugated terpene compound on stripping efficiency. Peppermint oils (a terpene compound) was substituted for the alpha-terpinene previously used.

| | | |
|---|---|---|
| | Peppermint Oils | 30.0 |
| | Bentone 38 | 3.0 |
| | Benzyl Alcohol | 40.0 |
| | Dipentene | 21.0 |
| | Bentone (EW) | 6.0 |

Aliquots from Example 22 were applied to test panels to observe the efficacy of the composition without the presence of large quantities of conjugated diene terpene (the dipentene did contain about 12% to about 15% by weight conjugated terpenes which at least partially provide activity in the instant compositions. We concluded that the presence of conjugated diene is at least partially responsible for the enhanced stripping activity exhibited by the present invention.

Examples 23–44

These examples were prepared to determine the impact of terpene alcohols on the stripping efficiency of compositions according to the present invention. Terpene alcohols proved to be useful in compositions according to the present invention. We note that the dipentene used in these examples contained from 12% to about 15% by weight of conjugated terpene compounds. Although these compositions were active and provided adequate stripping efficiency, the rather small amount of conjugated terpenes (ranging from about 3–4% by weight with the exception of example 32, which contained about 30–31% by weight conjugated terpenes) did not provide the stripping efficiency of compositions containing larger quantities of conjugated terpene compounds.

Example 23

| | |
|---|---|
| Dimethyl Octanol | 27.0 |
| Bentone 38 | 3.0 |
| Benzyl Alcohol | 40.0 |
| Dipentene | 24.0 |
| Bentone (EW) | 6.0 |

Example 24

| | |
|---|---|
| Dihydromyrcenol | 27.0 |
| Bentone 38 | 3.0 |
| Benzyl Alcohol | 40.0 |
| Dipentene | 24.0 |
| Bentone (EW) | 6.0 |

Example 25

| | |
|---|---|
| Dihydroterpineol | 27.0 |
| Bentone 38 | 3.0 |
| Benzyl Alcohol | 40.0 |
| Dipentene | 24.0 |
| Bentone (EW) | 6.0 |

Example 26

| | |
|---|---|
| Dihydrolinalool | 27.0 |
| Bentone 38 | 3.0 |
| Benzyl Alcohol | 40.0 |
| Dipentene | 24.0 |
| Bentone (EW) | 6.0 |

Example 27

| | |
|---|---|
| Citronellol | 27.0 |
| Bentone 38 | 3.0 |
| Benzyl Alcohol | 40.0 |
| Dipentene | 24.0 |
| Bentone (EW) | 6.0 |

Example 28

| | |
|---|---|
| Dihydrocarveol | 27.0 |
| Bentone 38 | 3.0 |
| Benzyl Alcohol | 40.0 |
| Dipentene | 24.0 |
| Bentone (EW) | 6.0 |

Example 29

| | |
|---|---|
| Geraniol | 27.0 |
| Bentone 38 | 3.0 |
| Benzyl Alcohol | 40.0 |
| Dipentene | 24.0 |
| Bentone (EW) | 6.0 |

Example 30

| | |
|---|---|
| Arbanol | 27.0 |
| Bentone 38 | 3.0 |
| Benzyl Alcohol | 40.0 |
| Dipentene | 24.0 |
| Bentone (EW) | 6.0 |

Example 31

| | |
|---|---|
| 95% Terpene Alcohol Solvents | 27.0 |
| Bentone 38 | 3.0 |
| Benzyl Alcohol | 40.0 |
| Dipentene | 24.0 |
| Bentone (EW) | 6.0 |

Example 32

| | |
|---|---|
| Myrcene | 27.0 |
| Bentone 38 | 3.0 |
| Benzyl Alcohol | 40.0 |
| Dipentene | 24.0 |
| Bentone (EW) | 6.0 |

Example 33

| | |
|---|---|
| Solvent Alcohols, flash pt. 200 | 27.0 |
| Bentone 38 | 3.0 |
| Benzyl Alcohol | 40.0 |
| Dipentene | 24.0 |
| Bentone (EW) | 6.0 |

Example 34

| | |
|---|---|
| Trans-2 Hexanol | 27.0 |
| Bentone 38 | 3.0 |
| Benzyl Alcohol | 40.0 |
| Dipentene | 24.0 |
| Bentone (EW) | 6.0 |

Example 35

| | |
|---|---|
| Trans-2-Hexanal | 27.0 |
| Bentone 38 | 3.0 |
| Benzyl Alcohol | 40.0 |
| Dipentene | 24.0 |
| Bentone (EW) | 6.0 |

Example 36

| | |
|---|---|
| Linalool | 27.0 |
| Bentone 38 | 3.0 |
| Benzyl Alcohol | 40.0 |
| Dipentene | 24.0 |
| Bentone (EW) | 6.0 |

Example 37

| | |
|---|---|
| Nerol | 27.0 |
| Bentone 38 | 3.0 |
| Benzyl Alcohol | 40.0 |
| Dipentene | 24.0 |
| Bentone (EW) | 6.0 |

Example 38

| | |
|---|---|
| Nopol | 27.0 |
| Bentone 38 | 3.0 |
| Benzyl Alcohol | 40.0 |
| Dipentene | 24.0 |
| Bentone (EW) | 6.0 |

Example 39

| | |
|---|---|
| Menthol | 27.0 |
| Bentone 38 | 3.0 |
| Benzyl Alcohol | 40.0 |
| Dipentene | 24.0 |
| Bentone (EW) | 6.0 |

Example 40

| | |
|---|---|
| 3-Octanol | 27.0 |
| Bentone 38 | 3.0 |
| Benzyl Alcohol | 40.0 |
| Dipentene | 24.0 |
| Bentone (EW) | 6.0 |

Example 41

| | |
|---|---|
| cis-2-Pinanol | 27.0 |
| Bentone 38 | 3.0 |
| Benzyl Alcohol | 40.0 |
| Dipentene | 24.0 |
| Bentone (EW) | 6.0 |

Example 42

| | |
|---|---|
| Fernlol | 27.0 |
| Bentone 38 | 3.0 |
| Benzyl Alcohol | 40.0 |
| Dipentene | 24.0 |
| Bentone (EW) | 6.0 |

Example 43

| | |
|---|---|
| Terpineol | 27.0 |
| Bentone 38 | 3.0 |
| Benzyl Alcohol | 40.0 |
| Dipentene | 24.0 |
| Bentone (EW) | 6.0 |

Example 44

| | |
|---|---|
| Tetrahydrolinallol | 27.0 |
| Bentone 38 | 3.0 |
| Benzyl Alcohol | 40.0 |
| Dipentene | 24.0 |
| Bentone (EW) | 6.0 |

Example 45

| | |
|---|---|
| Tetrahydromyrcenol | 27.0 |
| Bentone 38 | 3.0 |
| Benzyl Alcohol | 40.0 |
| Dipentene | 24.0 |
| Bentone (EW) | 6.0 |

Example 46

| | |
|---|---|
| Tetralol | 27.0 |
| Bentone 38 | 3.0 |
| Benzyl Alcohol | 40.0 |
| Dipentene | 24.0 |
| Bentone (EW) | 6.0 |

Examples 47 and 48

Examples 47–48 were prepared to determine the effect that the instant invention would have on prior art compositions and in particular, compositions disclosed in U.S. Pat. No. 5,098,591, issued Mar. 24, 1992. In particular, Part A in Examples 47 and 48 was comprised of the present invention composition (except Part A of Example 48 contained no chlorophyll), whereas Part B of each example was made from components set forth in the '591 patent described above. Part B, as tested by an independent laboratory, was shown to be one of the most active non-toxic, biodegradable paint strippers available. In each of these examples, an equal amount of Part A was added to Part B and mixed by hand to produce a composition containing the same componentry of the present invention plus the componentry of the prior art. Part B of each example represented the prior art composition.

A mixture of Part A and Part B from each of examples 47 and 48 was applied to the standard 9" by 12" panels. Part B of each example was likewise applied to the panels. The panels were then exposed to indirect light. The mixtures of A and B in each example stripped through eight paint layers (including a primer layer) within 2 and ½ hours, whereas the part B product required about 24 hours.

Example 47

| PART A | |
|---|---|
| Alpha-Terpinene | 27.0 |
| Bentone 38 | 3.0 |
| Benzyl Alcohol | 40.0 |
| Chlorophyll MM | 1.0 |
| Dipentene | 23.0 |
| Bentone (EW) | 6.0 |
| PART B | |
| Bentone (EW) | 3.0 |
| Ethanol | 3.0 |
| Water | 10.0 |
| PD-600 (Surfactant) | 2.0 |
| Methyl Pyrollidone | 46.0 |
| Propylene Carbonate | 29.0 |
| Dipentene | 7.0 |

Example 48

| PART A | |
|---|---|
| Alpha-Terpinene | 27.0 |
| Bentone 38 | 3.0 |
| Benzyl Alcohol | 40.0 |
| Dipentene | 24.0 |
| Bentone (EW) | 6.0 |
| PART B | |

-continued

| | |
|---|---|
| Bentone (EW) | 3.0 |
| Ethanol | 3.0 |
| Water | 10.0 |
| PD-600 | 2.0 |
| Methyl Pyrollidone | 46.0 |
| Propylene Carbonate | 29.0 |
| Dipentene | 7.0 |

Examples 49–59

These 11 examples evidence the utility of the instant invention to remove and strip tough military coatings.

The general method employed in these examples is as follows: Certified test panels conforming to Military Specification MIL-R-81294D, supplied by a vendor recommended by the U.S. Navy were used to simulate aircraft surfaces. The panels represent the two paint systems currently used on naval aircraft. One panel consists of a polyamide/epoxy primer with an epoxy topcoat; the other the same primer with a polyurethane topcoat.

Compositions were applied by spatula to all test specimens on an area about 1 in.² in area, approximately 3 mm. (about ⅛") to about 6 mm. (about ¼") thick. Test panels were then inserted into a chamber and subjected to conditions being evaluated, i.e., radiant heat, U.V., infra-red or combinations of those conditions for varying times. Times of exposure were measured and noted.

Panels were also tested after exposure to measured irradiance from the following light sources:

1000 Watt mercury vapor lamp;
250 Watt infra-red lamp;
250 Watt infra-red lamp with visible light blocked;
Available sunlight.

It was noted that all panels attained a surface temperature of at least about 42° C. (about 110° F.) using the varying forms of irradiation.

Additional artificial substrates of a non-military specification were also utilized during evaluation and testing of the invention.

Complete lifting of all paint coatings with the primer from the substrate was considered a success.

The following paint stripper formulations were prepared according to the general method described above for examples 1–60.

Example 49

| | |
|---|---|
| AMP (Aminomethylpropanol) | 4% |
| SD-3 | 5% |
| Alpha-terpinene (75%) | 16% |
| Propylene Carbonate | 15% |
| Benzyl Alcohol | 50% |
| Bentone EW | 10% |

Example 50

| | |
|---|---|
| AMP (95) | 2.5% |
| SD-3 (Organoclay Rheological) | 5% |
| Alpha-terpinene (75%) | 29% |
| Dipentene | 15% |
| Benzyl Alcohol | 39% |
| Bentone EW | 9.5% |

Example 51

| | |
|---|---|
| Alpha-terpinene (75%) | 23.1% |
| Dipentene | 15.3% |
| Bentone 38 | 7.7% |
| Benzyl Alcohol | 38.5% |
| Bentone EW | 15.4% |

Example 52

| | |
|---|---|
| Alpha-terpinene (75%) | 29% |
| Dipentene | 15% |
| Bentone 38 | 5% |
| Benzyl Alcohol | 37% |
| Bentone EW | 10% |
| DBSA (Dodecyl benzylsulfonic acid) | 4% |

Example 53

| | |
|---|---|
| Alpha-terpinene (75%) | 29% |
| Dipentene | 15% |
| Bentone 38 | 5% |
| Benzyl Alcohol | 39% |
| Bentone EW | 10% |
| DBSA (Dodecyl benzylsulfonic acid) | 2% |

Example 54

| | |
|---|---|
| Alpha-terpinene (75%) | 36.3% |
| Dipentene | 11% |
| Bentone 38 | 12.9% |
| Benzyl Alcohol | 19.5% |
| Bentone EW | 20.2% |

Example 55

| | |
|---|---|
| Alpha-terpinene (75%) | 36% |
| Dipentene | 11% |
| Bentone 38 | 12.9% |
| Chlorophyll (MM) | 0.5% |
| Benzyl Alcohol | 19.3% |
| Bentone EW | 20.2% |

Example 56

| | |
|---|---|
| Alpha-terpinene (75%) | 36% |
| Dipentene | 11% |
| Bentone 38 | 12.9% |
| Benzyl Alcohol | 19.3% |
| Bentone EW | 20.2% |

Example 57

| | |
|---|---|
| Alpha-terpinene (75%) | 20% |
| Dipentene | 6% |
| Bentone 38 | 7% |
| Benzyl Alcohol | 40% |
| Bentone EW | 27% |

Example 58

| | |
|---|---|
| Alpha-terpinene (75%) | 33.3% |
| Dipentene | 10.1% |
| Bentone 38 | 11.8% |
| Benzyl Alcohol | 26.3% |
| Bentone EW | 18.5% |

Example 59

| | |
|---|---|
| Alpha-terpinene (75%) | 29% |
| Dipentene | 17.8% |
| Bentone 38 | 9.6% |
| Alpha-terpineol | 5% |
| Benzyl Alcohol | 19.4% |
| Bentone EW | 19.4% |

Example 60

| | |
|---|---|
| Alpha-terpinene (754) | 16.3% |
| Dipentene | 4.9% |
| Bentone 38 | 5.8% |
| Benzyl Alcohol | 40.3% |
| Bentone EW | 32.7% |

Each of the stripping compositions from examples 49–60 completely lifted the military coatings including the primer coating within a period ranging from about 45 minutes to about 90 minutes using each of the methods (UV, IR, radiant heat and sunlight). The formulations were modified in order to determine workability of the compositions for use on vertical surfaces. The preferred method for stripping includes the use of radiant heat where it is applicable. In most cases the use of light sources is generally advantageous.

It is to be understood that the examples and embodiments described hereinabove are for the purposes of providing a description of the present invention by way of example and are not to be viewed as limiting the present invention in any way. Various modifications or changes that may be made to that described hereinabove by those of ordinary skill in the art are also contemplated by the present invention and are to be included within the spirit and purview of this application and the following claims.

I claim:

1. A composition for use in removing polymeric coatings from flexible and inflexible surfaces consisting essentially of:
   a) about 10% to about 40% by weight of a conjugated terpene selected from the group consisting of alpha-terpinene, tagetone, terpinolene, isoterpinolene, allo-ocimene, myrcene, ocimenone and mixtures thereof;
   b) about 25% to about 90% by weight of an alcohol according to the structure:

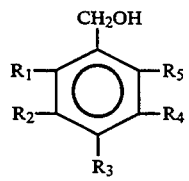

where $R_1$–$R_5$ are H, $C_1$–$C_5$ alkyl, $NH_2$, OH or $OCH_3$;
with the proviso that when one of $R_1$, $R_2$, $R_3$, $R_4$ or $R_5$ is $NH_2$, OH or $OCH_3$, the remainder of $R_1$, $R_2$, $R_3$, $R_4$ or $R_5$ are H or $C_1$–$C_3$ alkyl;
   c) 0% to about 70% by weight of a terpene compound other than a conjugated terpene selected from the group consisting of alpha-terpinene, tagetone, terpinolene, isoterpinolene, allo-ocimene, myrcene, ocimenone and mixtures thereof;
   d) 0% to about 20% by weight of a surfactant; and
   e) about 0.05% to about 60% by weight of an organoclay rheological additive, wherein the weight ratio of said conjugated terpene to said alcohol in said formulation ranges from about 1:1 to about 1:10.

2. The composition according to claim 1 wherein one or more of $R_1$, $R_3$, or $R_5$ is $C_1$–$C_3$ alkyl and the remaining $R_1$–$R_5$ are H.

3. The composition according to claim 1 wherein each of $R_1$–$R_5$ is H.

4. The composition according to claim 1 wherein said conjugated terpene is selected from the group consisting of alpha-terpinene, terpinolene, isoterpinolene, allo-ocimene and myrcene.

5. The composition according to claim 1 wherein said conjugated terpene is alpha-terpinene.

6. The composition according to claim 3 wherein said conjugated terpene is alpha-terpinene.

7. The composition according to claim 1 wherein said rheological additive comprises a hydrophilic organoclay rheological additive in an amount ranging from about 5% to about 40% by weight.

8. The composition according to claim 1 wherein said surfactant comprises about 0.1% to about 20% by weight.

9. The composition according to claim 1 wherein said terpene compound (c) comprises about 5% to about 50% by weight of said composition and is selected from the group consisting of alpha-pinene, beta-pinene, delta-3-carene, citronellal, d-limonene, gamma-terpinene, dipentene, dihydromyrcenol, dihydroterpineol, dihydrolinalool, citronellol, dihydrocarveol, geraniol, arbanol, linalool, nerol, menthol, nopol, cis-2-pinanol, isoborneol, allcimenol, fernlol, farnesol, fenchol, nerolidol, piperitol, borneol, cineol, isobulegol, allcimenol, tetrahydrolinallol, tetrahydromyrcenol, tetralol, tagetol, allo-camenol, carveol, myrcenol and mixtures thereof.

10. The composition according to claim 9 wherein said terpene compound (c) is d-limonene or dipentene.

11. The composition according to claim 1 further comprises at least one solvent selected from the group consisting of pyrrolidones and pyrrolidines, ethylene carbonate, propylene carbonate and butylene carbonate, dibasic esters, gamma-butyrolactone and mixtures thereof.

12. A method for removing a polymer coating from flexible and inflexible surfaces comprising applying a composition to said coating and exposing said coating and said composition to an energy source emitting light energy, said composition consisting essentially of:
   a) about 5% to about 90% by weight of a compound selected from the group consisting of conjugated terpene compounds, beta-carotene and lycopene;
   b) about 10% to about 95% by weight of an alcohol according to the structure:

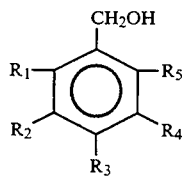

where $R_1$–$R_5$ are H, $C_1$–$C_5$ alkyl, $NH_2$, OH or $OCH_3$;

with the proviso that when one of $R_1$, $R_2$, $R_3$, $R_4$ or $R_5$ is $NH_2$, OH or $OCH_3$, the remainder of $R_1$, $R_2$, $R_3$, $R_4$ or $R_5$ are H or $C_1$–$C_3$ alkyl;

c) 0% to about 70% by weight of a terpene compound other than a conjugated terpene compound;

d) 0% to about 20% by weight of a surfactant; and e) about 0.05% to about 60% by weight of a rheological additive.

13. The method according to claim 12 wherein said surfactant comprises about 0.1% to about 20% by weight of said composition.

14. The method according to claim 12 wherein said conjugated terpene compound comprises about 10% to about 50% by weight of said composition and is selected from the group consisting of alpha-terpinene, myrcene, hymentherene, cosmene, tagetol, phellandrene, citral, ocimene, ocimenone, myrcenol, terpinolene, isoterpinolene, allo-ocimene, ocimenone, tagetone, tagetol and mixtures thereof.

15. The method according to claim 14 wherein said conjugated terpene compound is selected from the group consisting of alpha-terpinene, myrcene, terpinolene, isoterpinolene and allo-ocimene.

16. The method according to claim 12 wherein one or more of $R_1$, $R_3$, or $R_5$ is $C_1$–$C_3$ alkyl and the remaining $R_1$–$R_5$ are H.

17. The method according to claim 12 wherein each of $R_1$–$R_5$ is H.

18. The method according to claim 17 wherein said conjugated terpene is selected from the group consisting of alpha-terpinene, terpinolene, isoterpinolene, allo-ocimene and myrcene.

19. The method according to claim 18 wherein said conjugated terpene is alpha-terpinene.

20. The method according to claim 12 wherein said rheological additive is a hydrophilic organoclay rheological additive in an amount ranging from about 5% to about 50% by weight.

21. The method according to claim 12 wherein said terpene compound (c) comprises about 5% to about 50% by weight of said composition and is selected from the group consisting of alpha-pinene, beta-pinene, delta-3-carene, citronellal, d-limonene, gamma-terpinene, dipentene, dihydromyrcenol, dihydroterpineol, dihydrolinalool, citronellol, dihydrocarveol, geraniol, arbanol, linalool, nerol, menthol, nopol, cis-2-pinanol, isoborneol, allcimenol, fernlol, farnesol, fencnol, nerolidol, piperitol, berneol, cineol, isobulegol, allcimenol, tetrahydrolinallol, tetrahydromyrcenol, tetralol, tagetol, allo-camenol, carveol, myrcenol and mixtures thereof.

22. The method according to claim 21 wherein said terpene compound (c) is selected from d-limonene and dipentene.

23. The method according to claim 12 wherein said alcohol is benzyl alcohol in amount ranging from about 20% to about 50% by weight.

24. The method according to claim 12 wherein said conjugated terpene compound comprises about 10% to about 40% by weight of said composition.

25. The method according to claim 23 wherein said conjugated terpene compound comprises about 10% to about 40% by weight of said composition.

26. The method according to claim 21 wherein said rheological additive is a hydrophilic organoclay rheological additive.

27. The method according to claim 12 wherein said composition further comprises at least one solvent selected from the group consisting of pyrrolidones and pyrrolidines, ethylene, carbonate propylene carbonate and butylene carbonate, dibasic esters, gamma-butyrolactone and mixtures thereof.

28. The method according to claim 12 wherein said energy source emits energy obtained from direct sunlight.

29. The method according to claim 12 wherein said energy source emits UV light energy at a wavelength within the range of about 240 to about 400 nm.

30. The method according to clam 2 wherein said energy source emits UV light energy at a wavelength within the range of about 240 to about 320 nm.

31. The method according to claim 12 wherein said energy source is an infrared energy source.

32. The method according to claim 12 wherein said energy source produces a temperature on the surface of said coating of between about 32° C. and 63° C.

33. The method according to claim 30 wherein said energy source produces a temperature on the surface of said coating of between about 43° C. and about 63° C.

34. A method for removing a polymer coating from flexible and inflexible surfaces comprising applying a composition to said coating and exposing said coating and said composition to an energy source emitting light energy, said composition consisting essentially of:

a) about 10% to about 40% by weight of alpha-terpinene;

b) about 20% to about 50% by weight of benzyl alcohol;

c) 0% to about 70% by weight of a terpene compound other than alpha-terpinene;

d) 0% to about 20% by weight of a surfactant; and e) about 0.05% to about 60% by weight of a rheological additive.

35. The method according to claim 34 wherein said rheological additive is an organoclay rheological additive.

36. The method according to claim 34 wherein said composition further comprises at least one solvent selected from the group consisting of ethylene carbonate, propylene carbonate, butylene carbonate, dibasic esters, gamma-butyrolactone and mixtures thereof.

37. The method according to claim 34 wherein said energy source emits direct sunlight.

38. The method according to claim 34 wherein said energy source emits UV light energy at a wavelength within the range of about 240 to about 400 nm.

39. The method according to claim 38 wherein said energy source emits UV light energy at a wavelength within the range of about 240 to about 320 nm.

40. The method according to claim 34 wherein said energy source is an infrared energy source.

41. The method according to claim 34 wherein said energy source produces a temperature on the surface of said coating of between about 32° C. and 63° C.

42. The method according to claim 34 wherein said energy source produces a temperature on the surface of said coating of between about 43° C. and about 63° C.

43. A paint or polymer removing composition consisting essentially of:
  a) about 10% to about 40% by weight of alpha-terpinene;
  b) about 20% to about 50% by weight of benzyl alcohol;
  c) 0% to about 70% by weight of a terpene compound other than alpha-terpinene;
  d) 0% to about 20% by weight of a surfactant; and
  e) about 0.05% to about 60% by weight of a rheological additive, wherein said alpha-terpinene and said benzyl alcohol are included in said composition at a weight ratio of about 1:1 to about 1:3.

44. The composition according to claim 43 wherein said rheological additive is an organoclay rheological additive.

45. The composition according to claim 43 wherein said composition further comprises at least one solvent selected from the group consisting of ethylene carbonate, propylene carbonate, butylene carbonate, dibasic esters, gamma-butyrolactone and mixtures thereof.

46. The composition according to claim 45 wherein said solvent is a dibasic ester.

* * * * *